Aug. 16, 1960 A. ZAHA 2,949,317
AUTOMOTIVE TRAILER HAVING CASTER WHEELS
Filed Sept. 5, 1958 3 Sheets-Sheet 1

INVENTOR.
ABE ZAHA
BY
*Smith & Tuck*

Aug. 16, 1960                A. ZAHA                2,949,317
AUTOMOTIVE TRAILER HAVING CASTER WHEELS
Filed Sept. 5, 1958                        3 Sheets-Sheet 2
FIG.___3
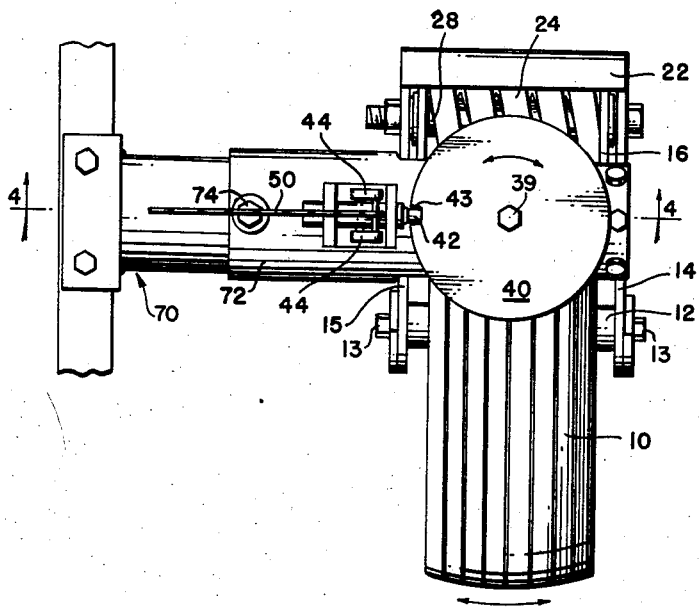
FIG.___5
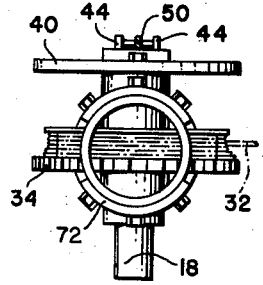
FIG.___4
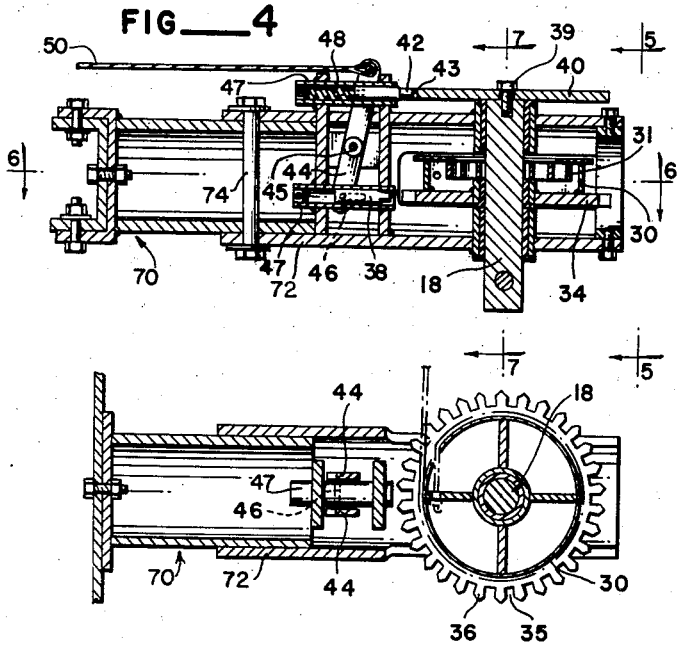
FIG.___6
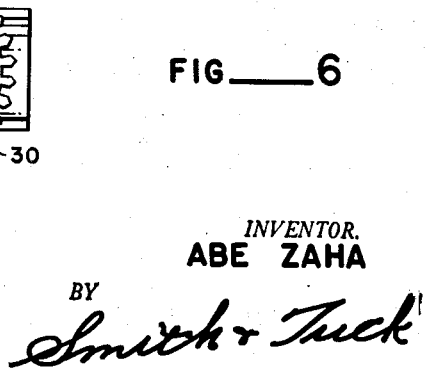
INVENTOR.
ABE ZAHA
BY
Smith & Tuck Aug. 16, 1960 A. ZAHA 2,949,317
AUTOMOTIVE TRAILER HAVING CASTER WHEELS
Filed Sept. 5, 1958 3 Sheets-Sheet 3

INVENTOR.
ABE ZAHA
BY
Smith & Tuck

United States Patent Office 2,949,317
Patented Aug. 16, 1960

2,949,317

AUTOMOTIVE TRAILER HAVING CASTER WHEELS

Abe Zaha, Pendleton, Oreg.

Filed Sept. 5, 1958, Ser. No. 759,266

4 Claims. (Cl. 280—456)

This present invention relates to an automotive type of trailer in which the supporting wheels are individually mounted upon caster means. More specifically this invention comprises those essential elements, which make it possible to use the wheels as caster wheels for maneuvering and particularly for backing the trailer and with further means for locking the caster feature of the wheels so that on the highway the trailer may be towed at speed with the same facility as trailers having fixed axles for their wheels.

In the past many attempts have been made to provide wheeled trailers with caster mounted supporting wheels in an endeavor to obtain the ease of maneuver possible by such arrangements. It has been determined from use, however, that it is necessary to provide several co-acting features if such a trailer is to be capable of giving the high degree of maneuvering ability desired and at the same time be a safe trailer to tow at speed on the highway. In this present trailer, it is believed that these various perplexing problems have been met and solved in a practical way, so that a trailer of unusual maneuverability is available particularly when backing and the like is undertaken. Yet when the trailer is towed on a highway with the wheels locked, they can be provided with the degree of toe-in that has been found so desirable in improving the steering of the trailer and permit them to be towed without road wander or shimmying. There is a very great demand for a trailer with this range of capabilities because there are a great number of automobile owners who also own trailers of various types. These may be generally divided into utility trailers for general transport of goods, house trailers, and trailers for boats. In all forms, the individual owners as a rule do not have the experience in maneuvering these vehicles, which they use only at intervals and therefore there is a very appreciable demand for trailers that are simple to maneuver particularly in backing in confined quarters. It is believed, that this present trailer has provided a practical solution of these various problems as well as to provide a trailer that can be safely towed at high speed on a highway.

The principal object of this present invention, therefore, is to provide an automotive type trailer in which the various wheels are individually mounted on substantially vertical shafts and with the horizontal axle displaced sufficiently from the vertical axis of rotation so that the wheel will track in all directions as a true caster wheel.

A further object is to provide means under selected control to lock out the castering effect of the wheels when it is desired to tow the same at speed.

A further object of this invention is to provide means, in effect, for coupling each of the caster wheels to the towing vehicle by means of flexible tension members disposed substantially above the tracks of the wheels.

A further object of this invention is to provide means whereby the flexible connecting means joining the wheels with the towing vehicle can be locked at the wheels thus causing the connected trailer to move as though it were part of the towing vehicle when it is desired to back up.

A further object of this invention is to provide spring actuated reel means for the flexible connector between the vehicle and the towed trailer so that slack can be taken up or payed out so that the flexible connectors will at all times be in a position for use even though the car and trailer may be going around curves or the like.

A further object of this present invention is to provide means for locking the caster action of the wheel supporting elements so that the wheels can be provided with adjusted toe-in and thus be capable of being towed with safety at high speed on a highway.

Further objects, advantages and capabilities will be apparent from the description and disclosure in the drawings, or may be comprehended or are inherent in the device.

In the drawings:

Figure 3 is a fragmentary view showing one wheel with its supporting and locking means.

Figure 4 is a vertical sectional view taken along the line 4—4 of Figure 3, showing the mechanism in the position where the wheel is locked against movement about its vertical axis.

Figure 5 is an end elevation of the showing of Figure 4 taken as viewed along the arrows 5—5 of Figure 4.

Figure 6 is a longitudinal section taken along the lines 6—6 of Figure 4.

Figure 1:
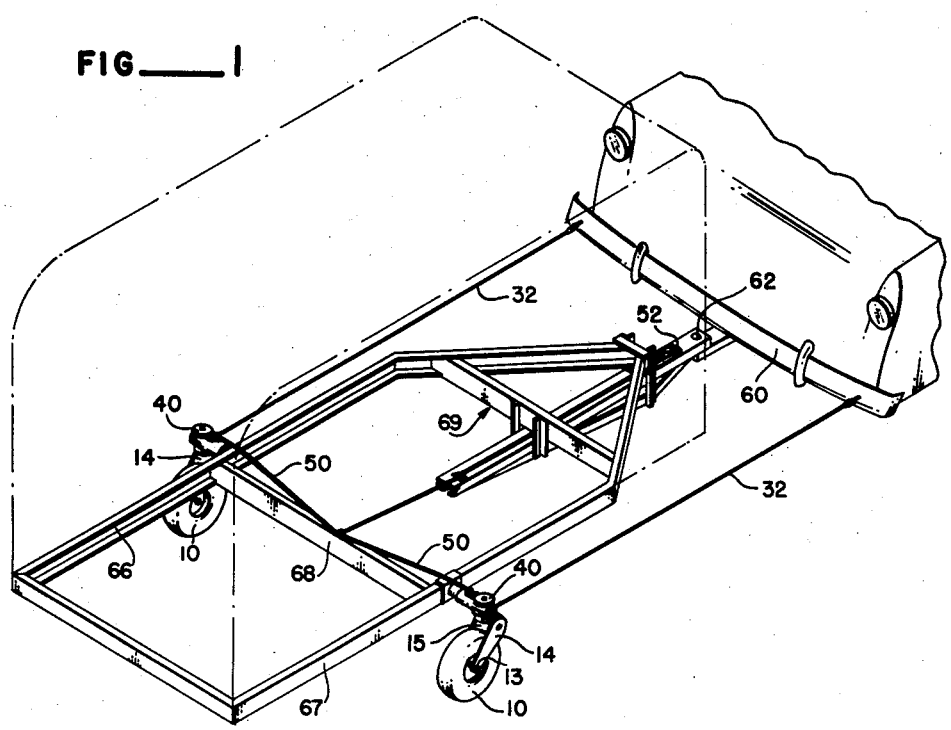
Figure 1 is a perspective view illustrating the general framework of a trailer and two caster wheels supporting the same, as those elements appear when coupled to an automobile. The outline of a house trailer is shown in dot and dash lines.

Referring to the drawings throughout which like reference numerals indicate like parts 10 designates an automotive type wheel and tire unit of which at least two, disposed on opposite sides of the vehicle, are employed. The wheel is supported on an automotive type axle assembly 12 having spindle 13 revolvably positioned therein. The axle 12 is in turn supported by two spaced apart fork members as 14 and 15. These fork members are joined together by a suitable framework 16, which framework in turn is fixedly secured as by welding thereto to the wheel caster shaft 18, which is preferably mounted in a vertical position so that wheels 10 will be capable of caster action in any direction. Framework 18 revolvably supports the fork assembly made of fork members 14 and 15, which in turn are joined together as a complete rigid fork by the spring shrouding or protecting member 22. Member 22 is preferably curved to fit around the load supporting torsion spring 24 and should be concentrically disposed with respect to pivot shaft 20. The torsion spring is secured at one end in fork member 14 as illustrated at 25 and the other end is adjustably positioned as by means of the set-screw 26, which may be made to selectively engage various portions of the free end of the spring 24. Turn supporting and limiting means is provided for spring 24 as is illustrated at 28.

Concentrically disposed about caster shaft 18 is the cable reel 30. Reel 30 is provided with an internally disposed spiral spring 31 positioned to normally wind up the trailer positioning cable 32. Further, the reel is provided with a toothed reel locking wheel 34, as best shown in plan view in Figure 6, and may take the form of a standard tooth gear. However, best locking is achieved when the tooth form, as illustrated in Figure 6, is provided with square faced notches as shown at 35 and between the notches a pointed portion 36 is provided so that the locking pawl 38 will quickly find engagement in one of the notches 35, so that both cable reels, one on each wheel, will provide two taut cable connections to the towing vehicle, when it is desired to back up the trailer. At its upper end caster shaft 18 is provided with a caster shaft lock disc 40, which is fixedly secured to shaft 18, providing a locking means for the caster shaft and thus preventing any further caster action after the upper pawl 42 has become engaged with the single notch 43. A degree of adjustment is provided between disc 40 and shaft 18, as by bolt 39, so that the degree of toe-in desired for the two caster wheels 10 can be adjusted at this point. It will always be assured that the same toe-in will be present because there is only the single notch 43 in disc 40.

It is very essential, that means be provided so that when the caster action is called for, a definite manual act must retract pawl 42 and thus free the caster shaft 18. At the same time, the locking wheel of reel 30 must be engaged as by pawl 38, so that the flexible connectors connecting the trailer to the prime mover will both be secured as by the reels of the two wheels of the trailer, so that when backing, the trailer will, in effect, be a continuation of the frame of the primer mover. Such sequential action is best achieved by a single pawl lever 44 mounted for partial revolution on the fixed pivot 45. The opposite ends of lever 44 are operatively connected to pawls 38 and 42 by means of a pin and slot arrangement shown in dotted lines in Figure 4 at 46. This is also shown in Figure 6, where it will be clear that there are two parallel levers 44 employed. Slots 46 in the guides 47 of pawls 38 should be of sufficient length and width to insure the workability of this unit. For use on the average trailer, a cable as 50 appears as the most convenient means for operating the pawl lever 44 and this is led forward to a point near the trailer hitch after the showings of Figures 9 and 10 where a toggle lever as 52 is employed. The one lever 52 is adequate to handle both cables 50 and a single return spring 48 is sufficient.

Figure 2:
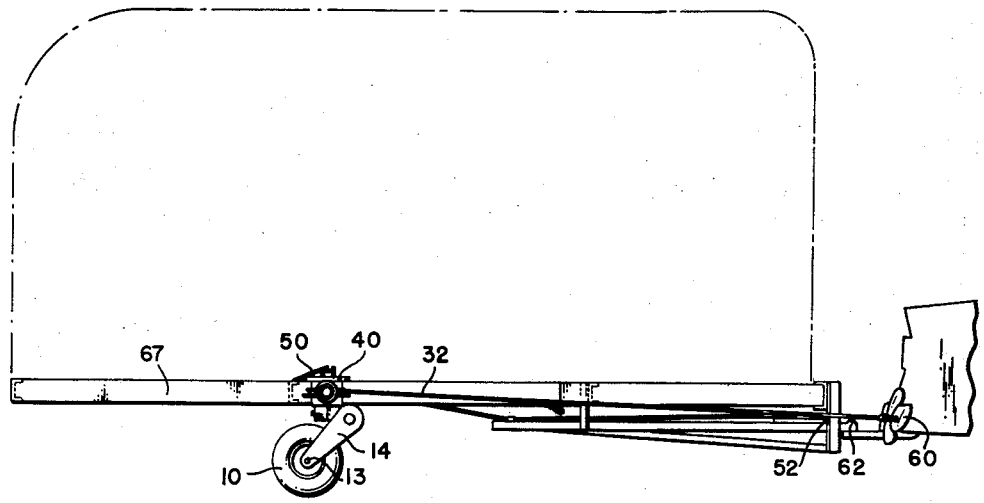
Figure 2 is a side elevation of the form of trailer and suggested housing as illustrated in Figure 1.
Figure 7:
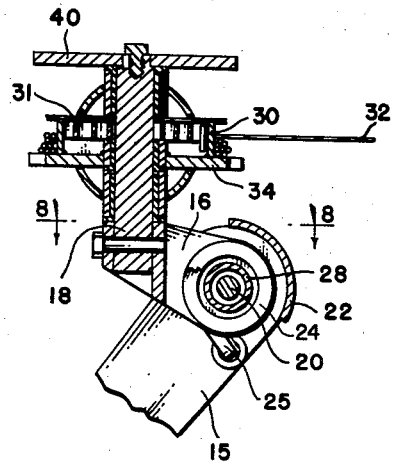
Figure 7 is a fragmentary view illustrating the pivot shaft of the caster and wheel assembly and showing the parts as though viewed along the lines 7—7 of Figure 4 and illustrating further the load supporting spring and associated parts.
Figure 8:
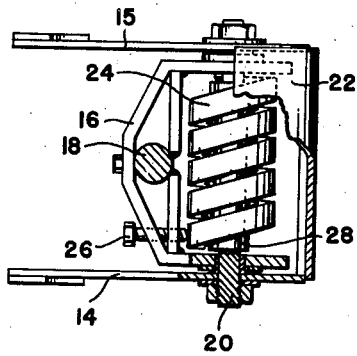
Figure 8 is a horizontal sectional view taken along the lines 8—8 of Figure 7 with certain parts further broken away to illustrate the manner of mounting the load supporting spring.
Figure 9:
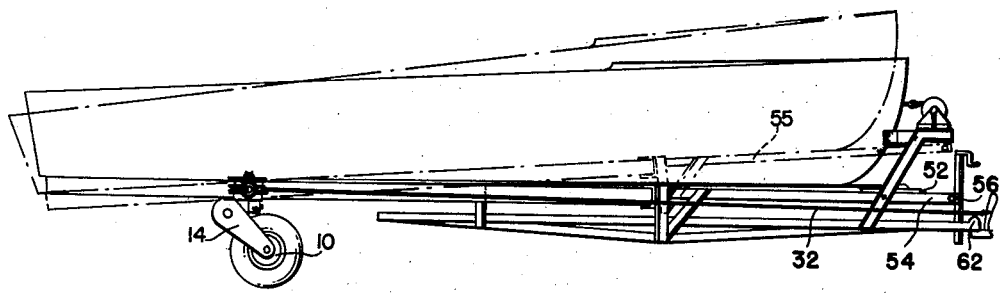
Figure 9 is a side elevation of a trailer made after the teachings of this present invention and showing the same as employed in supporting a boat, in transport position in full lines, and in the unloading position in dashed lines.
Figure 10:
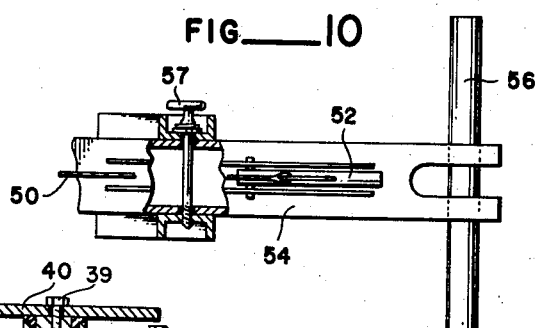
Figure 10 is a fragmentary view illustrating the cable handling means, which is employed to remotely operate the locking means for the wheel mounting equipment.

In Figure 10 the front end of the pivotable trailer member of Figure 9, is illustrated at 54 and this employs outstanding handles as 56 for convenience in tilting the upper trailer portion 55 so that a boat, after the showing of Figure 9, can be conveniently loaded or unloaded. The removable bolt 57 normally serves to hold the two frame members together except when the secondary frame 55 is tilted. Such an arrangement is not employed with the house trailer type of Figures 1 and 2. Referring to Figures 1 and 2, it is to be noted that cables 32, one on each side of the trailer, are preferably secured to the car frame through the brackets, which support the automobile bumper 60. For the lighter trailers, the cables 32 may be secured directly to the bumper as the load is not enough to distort the bumper under any normal conditions. The greatest loading, that might occur would arise if the trailer hitch at 62 should fail or become disconnected and then cables 32 would be serving as break-away cables and might be given considerable shock loading.

This caster wheel equipment may be adapted to various forms of trailers such as utility, house or boat trailers. It is preferred that substantial side frame members as 66 and 67 be employed and that at the point of attachment of the wheels, that a transverse frame member 68 be provided to lend rigidity to the wheel mount 70. The mount may be made from stamped, cast or fabricated parts as long as it houses the essential elements as noted. It is desirable that the wheel mount be arranged to be removable and replaceable as a unit assembly. In Figures 3, 4 and 6, one arrangement to serve this purpose is shown. A horizontal tubular wheel mount member 72 provides the main frame for the wheel mount assembly. Member 72 slidably engages one of the tubular wheel mount support members 70 which are also horizontally disposed and are fixedly secured, at one end, to the trailer frame members, as 66 and 67. Suitable means is provided to detachably secure the wheel mount member 72 to the wheel support member 70, as bolt 74.

Method of operation

In using a trailer equipped with my caster wheel assemblies and the control means for the same, it is possible to enjoy the advantages of both a fixed axle trailer and a swivel wheel trailer. For use on the highway, where it will be towed at considerable speed, it is very desirable to have the wheels in fixed fore-and-aft alignment with the direction of travel excepting for a reasonable amount of toe-in, which is a basic requirement if the trailer is to track accurately with its towing prime mover. The amount of this toe-in will depend somewhat on the type of tires and other considerations and the toe-in adjusting means, involving the locking screw 39, makes it possible to accurately adjust the toe-in.

Figure 11:
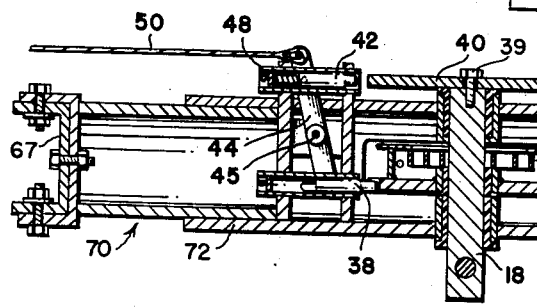
Figure 11 is a figure taken in the same sense as Figure 4 but showing the locking pawls in position to lock the cable reel instead of the pivot shaft as is shown in Figure 4.

Normally the trailer is towed by the connection at 62, which consists of the pintle, usually a ball with means to engage the ball and in order to negotiate horizontal and vertical curves, the trailer must be able to pivot on pintle 62. Under such conditions no use is made of cables 32, which are disposed on each side of the trailer and preferably parallel to and in close proximity to the track of the tires of the towing automobile and the trailer wheels. During this period of fixed wheel towing, cables 32 are merely kept as tight as spiral spring 31 can keep them and as curves are negotiated, the reels 30 on each side of the trailer will be paying out or retrieving a small amount of the cable. This condition is desirable so that at any time, the driver elects, he may pull on cable 50 manually as shown in Figure 1 by other remotely operated devices. When cable 50 is pulled, we have the condition as shown in Figure 11 in which the caster shaft is free to turn but reels 30 are locked by pawls 38, pawl 42 being withdrawn from lock disc 40 by the same movement of lever 44.

With wheels 10 free to caster about shafts 18 and with cables 32 now taut and locked, the trailer framework, formed principally of members 66, 67 and 68 with a front adapting assembly shown generally at 69, any movement of the prime mover will cause the trailer frame to move just as though it were a continuation of the car frame. Any tendency of the trailer to pivot about pintle 62 except vertically, being prevented by cables 32. Under such conditions even the unskilled person can back his car equipped, with this type of trailer, just as easily as he can back the car without a trailer except for the requirement of the extra length of the combined vehicles, which of course must be taken into account.

It is believed that it will be clearly apparent from the above description and the disclosure in the drawings that the invention comprehends a novel construction of an automotive trailer having caster wheels.

Having thus disclosed the invention, I claim:

1. A trailer adapted to use lockable caster supporting wheels, comprising: a frame having spaced side frame members adaptable for attaching caster wheel mounts and terminating at its front end with a trailer hitch; a horizontal tubular wheel mount adapted to be fixedly secured to each of the side frame members in a position extending horizontally, outwardly therefrom; a trailer supporting wheel mounted in said wheel mount; a vertical caster shaft revolvably mounted at the outer end of said wheel mount and having secured thereto, in axial alignment, a cable reel and a toothed, reel locking wheel; a caster shaft lock disc having a single locking notch secured to said shaft by means permitting variable toe-in adjustment of said wheel when it is locked against castering; pawl means operatively disposed within said wheel mount for locking said reel locking wheel and said caster shaft lock disc; separate trailer positioning cables disposed on the cable reel of each wheel unit assembly and having their outer ends secured to the prime mover for said trailer, the used portion of said cables being disposed substantially parallel with the longitudinal axis of said trailer; said pawl means for said caster shaft lock disc and said cable reel locking wheel having means for operating said locking pawls, arranged to withdraw one pawl from its locking position as the other pawl is moved to its locking position and remote operating means for said pawl operating means.

2. The subject matter of claim 1 in which said wheel mount, comprises: a said trailer supporting wheel having a horizontal spindle adapted to revolvably support said wheel; spaced fork members operatively secured to opposite ends of said spindle at their lower ends and joined to a spring shrouding at their upper ends; a framework fixedly secured to said caster shaft and pivotably secured to the upper end of said fork members by a wheel pivot shaft; a load supporting torsion spring disposed around said wheel pivot shaft with one end secured to one of the fork members and the other end secured to said framework in a manner to facilitate spring biased movement between said framework and said wheel.

3. A trailer having lockable caster wheels, comprising: a frame having spaced side frame members adaptable for attaching caster wheel mounts and terminating at its front end with a trailer hitch; a tubular wheel mount support member fixedly secured to each of the side frame members and extending horizontally outwardly therefrom; a wheel mount for each wheel having a horizontal tubular wheel mount member adapted for removable attachment to its coacting wheel mount support member; a vertical caster shaft revolvably mounted at the outer end of each of said wheel mounts and having disposed in axial alignment a caster shaft lock disc secured to said shaft by means permitting variable toe-in adjustments of said wheel when it is locked against castering; a cable reel and reel locking means for each side of said trailer comprising pawl means, operatively disposed within each of said wheel mounts for locking said reel locking means and said caster shaft lock disc; separate trailer positioning cables disposed on the cable reel of each wheel mount, one on each side of said trailer, and having their outer ends secured to the prime mover at laterally spaced points at opposite sides of the trailer hitch; pawl operating means for each wheel mount for operating said locking pawls and arranged to withdraw one pawl from its locking position as the other pawl is moved to its locking position; remote operating means for said pawls and resilient supporting means for said trailer disposed within each wheel mount.

4. The subject matter of claim 3 in which said positioning cables are disposed on spring biased reels, which are arranged to keep the cables taut at all times when the wheels are locked against caster action, and said reels subject to being locked by one of said pawls during the maneuvering period of said trailer and thus anchor the reel ends of the cables to facilitate fixing the relationship of the longitudinal axis of the trailer and its prime mover.

References Cited in the file of this patent

UNITED STATES PATENTS

| | | |
|---|---|---|
| 2,475,174 | Boone | July 5, 1949 |
| 2,537,521 | Forbes | Jan. 9, 1951 |